United States Patent
Rohrbach et al.

(10) Patent No.: US 8,008,396 B2
(45) Date of Patent: Aug. 30, 2011

(54) METHOD OF EMULSION POLYMERIZATION

(75) Inventors: William Douglas Rohrbach, Perkasie, PA (US); David Lewis Zimmerman, Jr., West Chester, PA (US)

(73) Assignee: Rohm and Haas Company, Philadelphia, PA (US)

( * ) Notice: Subject to any disclaimer, the term of this patent is extended or adjusted under 35 U.S.C. 154(b) by 303 days.

(21) Appl. No.: 12/384,420

(22) Filed: Apr. 2, 2009

(65) Prior Publication Data

US 2009/0253861 A1  Oct. 8, 2009

Related U.S. Application Data

(60) Provisional application No. 61/072,898, filed on Apr. 3, 2008.

(51) Int. Cl.
| | | |
|---|---|---|
| C08F 2/32 | (2006.01) | |
| C08F 283/00 | (2006.01) | |
| C08K 3/20 | (2006.01) | |
| C08L 31/00 | (2006.01) | |

(52) U.S. Cl. ......... 524/801; 524/457; 524/475; 524/556

(58) Field of Classification Search .................. 524/801, 524/457, 475, 556

See application file for complete search history.

(56) References Cited

U.S. PATENT DOCUMENTS

| | | | | |
|---|---|---|---|---|
| 6,117,939 | A | * | 9/2000 | Mathauer et al. ............. 524/832 |
| 6,252,016 | B1 | | 6/2001 | Wu et al. |
| 6,320,000 | B1 | * | 11/2001 | Hurry et al. .................... 526/67 |
| 6,660,814 | B1 | | 12/2003 | Kroner |
| 2004/0048969 | A1 | | 3/2004 | Kirsch |
| 2004/0143053 | A1 | | 7/2004 | Wu |
| 2005/0261423 | A1 | | 11/2005 | Funkhauser |

OTHER PUBLICATIONS

Feng, et al., "Industrial Polymerization Apparatus (IV). Emulsion Polymerization Reactors (Part 1)", China Synthetic Rubber Industry, v. 17, No. 5, pp. 299-303, 1994.

* cited by examiner

*Primary Examiner* — Michael M Bernshteyn
(74) *Attorney, Agent, or Firm* — Carl P. Hemenway

(57) ABSTRACT

There is provided a process of emulsion polymerization comprising
(a) adding a reactive mixture to a reaction vessel, said reactive mixture comprising water, one or more emulsifier, one or more monomer, and one or more initiator,
(b) providing conditions in which said reactive mixture undergoes emulsion polymerization, and
(c) passing some of the contents of said reaction vessel through a recirculating loop comprising a low-shear pump and a plate and frame heat exchanger having gap width of 6 to 18 mm,
wherein more than 50% of the heat produced by said emulsion polymerization is removed from the contents of said reaction vessel by said plate and frame heat exchanger.

6 Claims, No Drawings

METHOD OF EMULSION POLYMERIZATION

This application claims the benefit of priority under 35 U.S.C. §119(e) of U.S. Provisional Patent Application No. 61/072,898 filed on Apr. 3, 2008.

BACKGROUND

This invention relates to emulsion polymerization processes. Such processes are normally exothermic, and in many cases, it is difficult to remove enough heat from the reaction vessel to prevent the contents of the reaction vessel from reaching undesirably high temperatures such as, for example, temperatures of 100° C. or higher. In many cases, transfer of heat through the walls of the reaction vessel does not remove enough heat from the contents of the reaction vessel to keep the temperature of the contents of the reaction vessel desirably low.

One effective method of removing heat from the contents of the reaction vessel is passing a portion of the contents of the reaction vessel through a recirculating loop that contains a heat exchanger. For example, U.S. Pat. No. 6,3200,000 describes a process for preparing polymer that includes pumping the polymer through an external loop.

One difficulty with such external recirculating loops is that they are prone to imparting shear to the material being passed through them, and the shear can cause emulsion polymers to coagulate. Some emulsion polymers are more susceptible to coagulation than others. It is desired to provide a process for emulsion polymerization that provides effective cooling and that has a reduced tendency to cause emulsion polymers to coagulate.

STATEMENT OF THE INVENTION

In a first aspect of the present invention, there is provided a process of emulsion polymerization comprising
(a) adding a reactive mixture to a reaction vessel, said reactive mixture comprising water, one or more emulsifier, one or more monomer, and one or more initiator,
(b) providing conditions in which said reactive mixture undergoes emulsion polymerization, and
(c) passing some of the contents of said reaction vessel through a recirculating loop comprising a low-shear pump and a plate and frame heat exchanger having gap width of 6 to 18 mm,
wherein more than 50% of the heat produced by said emulsion polymerization is removed from the contents of said reaction vessel by said plate and frame heat exchanger.

DETAILED DESCRIPTION

A "polymer," as used herein and as defined by F W Billmeyer, JR. in *Textbook of Polymer Science*, second edition, 1971, is a relatively large molecule made up of the reaction products of smaller chemical repeat units. Polymers may have structures that are linear, branched, star shaped, looped, hyperbranched, crosslinked, or a combination thereof, polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Polymer molecular weights can be measured by standard methods such as, for example, size exclusion chromatography. Polymers have weight-average molecular weight (Mw) of 1,000 or more. Some polymers are fully crosslinked, and fully crosslinked polymers are considered to have infinite Mw.

Molecules that can react with each other to form the repeat units of a polymer are known herein as "monomers." Typical monomers have molecular weight of less than 400. Among the monomers useful in the present invention are molecules, for example, that have at least one carbon-carbon double bond. Among such monomers are, for example, vinyl monomers, which are molecules that have at least one vinyl group (i.e., CH2=CR—, where R is a hydrogen, a halogen, an alkyl group, a substituted alkyl group, or another substituted or unsubstituted organic group). Some suitable vinyl monomers include, for example, styrene, substituted styrenes, dienes, ethylene, ethylene derivatives, and mixtures thereof. Ethylene derivatives include, for example, unsubstituted or substituted versions of the following: vinyl acetate, acrylonitrile, (meth)acrylic acids, (meth)acrylates, (meth)acrylamides, vinyl chloride, halogenated alkenes, and mixtures thereof. As used herein, "(meth)acrylic" means acrylic or methacrylic; "(meth)acrylate" means acrylate or methacrylate; and "(meth)acrylamide" means acrylamide or methacrylamide. In some embodiments, "substituted" monomers include, for example, monomers with more than one carbon-carbon double bond, monomers with hydroxyl groups, monomers with other functional groups, and monomers with combinations of functional groups.

Chain transfer agents, including, for example, mercaptans, polymercaptans, and polyhalogen compounds, are sometimes desirable in the polymerization mixture to control polymer molecular weight. In some embodiments, no chain transfer agent is used.

"Polymerization" herein means the process of reacting monomers to form polymer. In the practice of the present invention, the process of polymerization is aqueous emulsion polymerization. The resulting polymer is known synonymously as a latex or as an emulsion polymer.

The process of emulsion polymerization is well known in the art, as discussed, for example, in detail in D. C. Blackley, Emulsion Polymerization (Wiley, 1975).

In aqueous emulsion polymerization, water forms the continuous medium in which polymerization takes place. The water may or may not be mixed with one or more additional compounds that are miscible with water. In some embodiments, the continuous medium contains 30% or more water; or 50% or more water; or 75% or more water; or 90% or more water; by weight based on the weight of the continuous medium.

Emulsion polymerization involves the presence of one or more emulsifier and one or more initiator. The initiator is usually water-soluble. Initiator is a compound that forms one or more free radical, which can initiate a polymerization process. Some suitable initiators form one or more free radical when heated. Some suitable initiators are oxidants and form one or more free radical when mixed with one or more reductant, or when heated, or a combination thereof. Some suitable initiators form one or more free radical when exposed to radiation such as, for example, ultraviolet radiation or electron beam radiation. A combination of suitable initiators is also suitable.

Some suitable emulsifiers include anionic surfactants, cationic surfactants, nonionic surfactants, zwitterionic surfactants, and mixtures thereof. In some embodiments, one or more anionic surfactant is used, optionally in a mixture with one or more nonionic surfactant. Some suitable anionic surfactants include, for example, alkyl sulfates, alkyl sulfonates, alkylaryl sulfates, alkylaryl sulfonates, and mixtures thereof.

Some suitable nonionic surfactants include, for example, alkyl polyoxyalkylene nonionic surfactants, aryl polyoxyalkylene nonionic surfactants, polyoxyalkylene block copolymers, and mixtures thereof.

In the practice of the present invention, a reactive mixture is provided in a reaction vessel. The reactive mixture contains water, one or more emulsifier, one or more monomer, and one or more initiator. The ingredients of the reactive mixture may be brought together in any manner. For example, two or more of the ingredients of the reactive mixture, or portions thereof, may be mixed together before the mixture of those ingredients or portions thereof is placed into the reaction vessel. For example, any ingredients or portions thereof that are not mixed together outside of the reaction vessel may be added simultaneously or sequentially to the reaction vessel. Any combination of the above methods of providing the ingredients of the reactive mixture may be used.

After a reactive mixture is present in the reaction vessel, conditions are provided in which the reactive mixture undergoes emulsion polymerization. For example, conditions will be provided as needed for the initiator to form one or more free radical. That is, depending on the initiator used, for example, the reaction mixture may be heated, or a reductant may be added, or the reactive mixture may be exposed to radiation, or a combination thereof. Also, it is contemplated that other conditions that allow emulsion polymerization to succeed (such as, for example, emulsification of monomer, concentration of monomer, concentration of initiator, etc.) will also be provided.

In some embodiments, the conditions in which the reactive mixture undergoes emulsion polymerization will be established simultaneously with the introduction of the reactive mixture into the reaction vessel. For example, if the ingredients of the reactive mixture are not added simultaneously, in some embodiments the conditions in which the reactive mixture undergoes emulsion polymerization may be established simultaneously with the introduction of the final ingredient of the reactive mixture into the reaction vessel.

In some embodiments, the conditions in which the reactive mixture undergoes emulsion polymerization will be established after the introduction of the reactive mixture into the reaction vessel. For example, all of the ingredients of the reactive mixture may be provided in the reaction vessel, and then the contents of the reaction vessel may be heated to a temperature at which the initiator forms one or more free radical.

It is contemplated that, in some embodiments, after the conditions in which the reactive mixture undergoes emulsion polymerization are established, additional monomer may be added, additional water may be added, additional emulsifier may be added, additional initiator may be added, or any mixture or combination thereof.

Emulsion polymerization processes may be characterized as single-stage or multi-stage. In one stage, a particular composition of monomer is polymerized until polymerization is complete. If a second composition of monomer, different from the monomer composition used in the immediately preceding stage, is then polymerized in the presence of the polymer formed in the first stage, the polymerization of the second composition of monomer is known as the second stage. Further subsequent stages may also be performed. In some embodiments, the polymerization process is a single-stage process.

In each stage of an emulsion polymerization process, the monomer is added either as a shot addition or as a gradual addition or as a combination thereof. In a shot addition, monomer is added relatively quickly (compared to the duration of the polymerization time), and then addition of all monomer is halted for a time. Often, during the time while addition of monomer is halted, polymerization occurs. In a particular stage of an emulsion polymerization process involving shot addition of monomer, a single shot addition may be used to add all the monomer for that stage, or multiple shot additions may be used.

In some embodiments (herein called "shot" embodiments), the emulsion polymerization process includes at least one stage that includes at least one shot. In some shot embodiments, at least one shot introduces 10% or more of the total monomer of the entire emulsion polymerization process, by weight based on the weight of the total monomer for the entire emulsion polymerization process. In some shot embodiments, most or all of the monomer for the emulsion polymerization process is added to the reaction vessel as part of one or more shots, and each shot introduces 10% or more of the total monomer of the entire emulsion polymerization process, by weight based on the weight of the total monomer for the entire emulsion polymerization process.

As used herein, "most or all of the monomer" means 50% or more of the monomer, by weight based on all of the monomer used in the emulsion polymerization process. In some embodiments, the amount of monomer added to the reaction vessel as one or more shots, where each shot introduces 10% or more of the total monomer of the entire emulsion polymerization process (by weight based on the weight of the total monomer for the entire emulsion polymerization process), is 75% or more; or 90% or more; or 100%.

When conducting emulsion polymerization, it is sometimes desired to introduce a free radical inhibitor, such as a nitroso or a nitroxide compound, into the reaction vessel prior to the start of polymerization. It is considered that the presence of such an inhibitor reduces or eliminates the generation of secondary particles and thus aids in careful control of the particle size of the emulsion polymer. In some embodiments of the present invention, no nitroso or nitroxide compound is introduced into the reaction vessel prior to the start of polymerization. In some embodiments, no free radical inhibitor is used, other than the amount normally mixed with monomer during storage, prior to polymerization.

The process of the present invention may be practiced with any monomer or mixture of monomers that is able to participate in emulsion polymerization. In some embodiments, the monomers used include one or more of styrene, one or more substituted styrenes, vinyl acetate, acrylonitrile, (meth)acrylic acid, one or more substituted or unsubstituted (meth)acrylate, one or more substituted or unsubstituted (meth)acrylamide, or any mixture thereof. In some embodiments, the monomers used include one or more of styrene, one or more unsubstituted alkyl acrylate ester, one or more unsubstituted alkyl methacrylate ester, or a mixture thereof.

In some embodiments, every monomer used is selected from styrene, one or more substituted styrene, vinyl acetate, acrylonitrile, (meth)acrylic acid, one or more substituted or unsubstituted (meth)acrylate, one or more substituted or unsubstituted (meth)acrylamide, and any mixture thereof. In some embodiments, every monomer used is selected from styrene, one or more unsubstituted alkyl acrylate ester, one or more unsubstituted alkyl methacrylate ester, and any mixture thereof.

Independently, in some embodiments, the monomers used do not include any monomer with carboxylic acid group. In some embodiments, the monomers used do not include any monomer with any acid group. In some embodiments, the monomers used do not include any monomer with any ionic group. In some embodiments, the emulsion polymer produced by the process of the present invention has no ionic group. An ionic group is a chemical group that is mostly or completely in ionized form when the emulsion polymer is at some range of pH values, and the range of pH values over which the group is mostly or completely in ionized form lies between pH of 2 and pH of 12.

In some embodiments in which one or more monomer is used that that has an ionic group, the amount of monomer with ionic group is 0.5% or less, by weight based on the total weight of monomer. In some embodiments in which one or more monomer is used that that has an ionic group, the amount of monomer with ionic group is 0.2% or less, or 0.1% or less. Independently, in some embodiments in which one or more monomer with ionic group is used, the monomer with ionic group includes one or more monomer that has a carboxylic acid group.

In some embodiments, no multi-functional monomer is used. Multifunctional monomer is monomer that has two or more carbon-carbon double bonds that are able to participate in the emulsion polymerization reaction. In some embodiments in which some multi-functional monomer is used, the amount of multifunctional monomer, by weight based on the total weight of monomer, is 0.5% or less; or 0.2% or less; or 0.1% or less.

In the practice of the present invention, at each moment of time, the amount of emulsifier that is present can be characterized as the total weight of all emulsifier added to the reaction vessel from the beginning of the process to that moment, expressed as a percentage, based on the total weight of all monomers added to the reaction vessel from the beginning of the process to that moment. It is contemplated that the amount of emulsifier may change during the process of the present invention, as monomer and/or emulsifier may be added to the reaction vessel during the process. In some embodiments, there is at least one moment during the process of the present invention, after polymerization has begun, while some of the contents of the reaction vessel are passing through the recirculating loop, at which the amount of emulsifier is 3% or less, or 2% or less, or 1.5% or less. In some embodiments, at every moment during the process of the present invention after polymerization begins, the amount of emulsifier is 3% or less, or 2% or less, or 1.5% or less.

In some embodiments, the process of the present invention produces polymer that has Mw of 1,000,000 or above; or 2,000,000 or above; or 4,000,000 or above. Independently, in some embodiments, the process of the present invention produces polymer, some or all of which is not fully crosslinked. A portion of a sample of polymer is not fully crosslinked if a solvent can be found in which that portion of the sample of polymer dissolves. For a particular sample of polymer, soluble fraction is defined as the amount by solids weight of the polymer sample that is soluble in a solvent, expressed as a percentage of the solids weight of the entire polymer sample. In some embodiments, the process of the present invention produces polymer that has soluble fraction of 50% or higher; or 75% or higher; or 90% or higher; or 95% or higher.

The emulsion polymer produced by the process of the present invention is in the form of polymer particles dispersed in an aqueous continuous medium. In some embodiments, the polymer particles have mean diameter of 10 nm or larger, or 30 nm or larger, or 100 nm or larger. Independently, in some embodiments, the polymer particles have mean diameter of 2,000 nm or smaller, or 1,000 nm or smaller, or 500 nm or smaller.

The practice of the present invention involves passing some or all of the contents of the reaction vessel through a recirculating loop. A recirculating loop is a pathway through which material is passed; the material exits the reaction vessel, passes through the recirculating loop, and returns to the reaction vessel. The recirculating loop used in the practice of the present invention contains a low-shear pump and a plate and frame heat exchanger. The plate and frame heat exchanger has gap width of 6 mm to 18 mm.

In some embodiments, the total volume of material contained in the recirculating loop is smaller than the total volume of the contents of the reaction vessel. In some embodiments, it is contemplated that the process may be conducted for a relatively long time and that all or nearly all of the contents of the reaction vessel eventually passes through the recirculation loop.

The volume of the material in the recirculating loop may usefully be characterized as a percentage based on the sum of total volumes of the material in the reaction vessel and the material in the recirculating loop. In some embodiments the volume of the material in the recirculating loop is 0.05% or more; or 0.1% or more; or 0.2% or more. Independently, in some embodiments, the volume of the material in the recirculating loop is 40% or less; or 20% or less.

The pump contained in the recirculating loop is a low-shear pump. A low-shear pump is a pump that does not impart high shear to the material being pumped. In the practice of the present invention, it is contemplated that all parts of the pump are designed to prevent imparting high shear to the material being pumped; that is, the mechanism of conveying the material, the inlet port, outlet port, and all other parts connected to the pump are all designed to prevent imparting high shear to the material being pumped.

Suitable pumps may be any type of pump, as long as the pump is a low-shear pump. Suitable pumps may be, for example, rotodynamic pumps or positive displacement pumps. Suitable positive displacement pumps include, for example, rotary pumps, peristaltic pumps, and reciprocating pumps. Suitable rotary positive displacement pumps include, for example, Maso/Sine™ pumps (Sundyne Corporation). Suitable reciprocating positive displacement pumps include, for example, diaphragm pumps and piston or plunger pumps. Suitable diaphragm pumps include, for example, those made by the Wilden. Pump & Engineering Company. Suitable rotodynamic pumps include, for example, disc pumps including, for example, those made by the Discflo Corporation. Other examples of suitable positive displacement pumps are the progressive cavity pumps, such as, for example, metering pumps made by Moyno, Inc.

In the practice of the present invention, material from the contents of the reaction vessel is passed through a recirculating loop, and that recirculating loop includes a plate and frame heat exchanger. A plate and frame heat exchanger has multiple parallel flat plates, and fluid passes through the chamber formed by the space between each pair of parallel plates. The chambers alternate; that is, in one chamber, hot fluid flows through, while in the adjacent chamber, cool liquid flows through, and the alternation between hot and cool liquids is maintained throughout. Each flat plate is made of metal and is corrugated to promote turbulent flow. It is contemplated that heat transfers from the hot liquid to the cool liquid.

In the practice of the present invention, it is contemplated that the hot liquid will be the contents of the reaction vessel. The cool liquid may be water or coolant or any liquid that has temperature lower than the contents of the reaction vessel. In some embodiments, the cool liquid is at ambient temperature (10° C. to 30° C., usually approximately 25° C.).

A plate and frame heat exchanger can be characterized by the width of the gap, which is the distance between any two of the parallel plates. In the practice of the present invention, the gap width is 6 mm to 18 mm. In some embodiments, the gap width is 8 mm or larger; or 10 mm or larger; or 11 mm or larger. Independently, in some embodiments, the gap width is 16 mm or smaller, or 14 mm or smaller.

The number of chambers (also called "channels") in the plate and frame heat exchanger through which hot fluid passes is 1 or more. Independently, in some embodiments, the number of chambers in the plate and frame heat exchanger through which hot fluid passes is 1000 or fewer; or 500 or fewer; or 200 or fewer.

It is contemplated that, when the process of the present invention is conducted, 50% or more of the heat produced by the emulsion polymerization (based on the total heat produced by emulsion polymerization).is removed from the contents of the reaction vessel through the plate and frame heat exchanger. In some embodiments, 75% or more of the heat produced by the emulsion polymerization (based on the total heat produced by emulsion polymerization) is removed from the contents of the reaction vessel through the plate and frame heat exchanger.

In some embodiments, the exotherm of the emulsion polymerization process produces sufficient heat to raise the temperature of the contents of the reaction vessel, if the recirculating loop were not present, by 10° C. or more; or 20° C. or more; or 40° C. or more.

It is contemplated that the process of the present invention is able to operate properly, even if a small or moderate amount of coagulum forms during the process. Coagulum is material formed when emulsion polymer particles stick together to form relatively large particles. Coagulum particles may have particle size of 0.01 mm or larger; or 0.1 mm or larger; or 1 mm or larger. In some embodiments, there is at least one moment during the process of the present invention where the amount of coagulum, by weight based on the total weight of monomer, is 0.01% or more; or 0.1% or more; or 0.2% or more; or 0.5% or more; or 1% or more. In some embodiments of the present invention, no coagulum forms.

In some embodiments, a mixing device, such as, for example, a static mixer, is also present in the recirculating loop. In some embodiments, no mixing device is present in the recirculating loop.

The items of the recirculating loop may be arranged in any order. In some embodiments, the low-shear pump is located at the exit of the plate and frame heat exchanger.

In some embodiments, one or more ingredients, such as, for example, initiator, monomer, emulsifier, or a mixture or combination thereof, is added to the material in the recirculating loop. In some embodiments, no ingredient is added to the material in the recirculating loop; in such embodiments, all addition of ingredients is done by introducing each ingredient or mixture of ingredients directly to the reaction vessel.

In some embodiments, the process of the present invention may be conducted to take advantage of an additional benefit. The process of the present invention allows material to be circulated through:the plate and frame heat exchanger even when that material is prone to catastrophic coagulation. One condition that makes emulsion polymers prone to coagulate catastrophically is high temperature. Thus, in some embodiments, the present invention allows the contents of the reaction vessel to pass without catastrophic coagulation through the plate and frame heat exchanger, at higher temperature than was possible using previously-known methods. Thus, if the cool liquid is at ambient temperature in all cases, the present invention allows the possibility of passing the contents of the reaction vessel through the plate and frame heat exchanger under conditions in which the difference in temperature between the hot liquid and the cool liquid is larger than previously possible. Because the efficiency of the cooling process is better when the difference in temperature between the hot liquid and the cool liquid is greater, the present invention, in some embodiments, can lead to improved efficiency of cooling.

It is to be understood that for purposes of the present specification and claims that each operation disclosed herein is performed at 25° C. unless otherwise specified.

EXAMPLES

In the following examples, MMA refers to Methyl Methacrylate, BA refers to Butyl Acrylate, and BMA refers to Butyl Methacrylate. In the recipes, the amounts shown refer to parts by weight.

The plate and frame heat exchangers used contain plates with mixing ridges on them to provide turbulence. The ridges are oriented to provide areas of variable flow. Suitable plate and frame heat exchangers are available from Tranter Incorporated, 1900 Old Burk Hwy, Wichita Falls, Tex., or alternatively Alfa Laval, or other suppliers.

Comparative Example A

The following ingredients were added to a 19 liter (5 gallon) reactor equipped with agitation and brought to a temperature of 42° C.
Water—6100 parts
Monomers (MMA/BA/BMA)—3400 parts
Sulfonate Surfactant—24 parts
Sodium Persulfate—5 parts
Sodium Formaldehyde Sulfoxylate—0.4 parts
Sodium Hydrosulfite—0.6 parts Following an induction period, the polymerization reaction occurred with no heating or cooling applied to the reactor. The temperature of the mixture reached 95° C. An additional 100 parts of Sulfonate surfactant and 200 parts of water were added to the reactor at this point.

The reaction mixture was drained to a plate and frame heat exchanger and returned to the reactor using a Peristaltic type pump equipped with 1.27 cm (0.5 inch) diameter Tygon™ tubing. The plate and frame heat exchanger was equipped with 7.1 cm×18.8 cm (2.8 inch×7.4 inch) plates having a process side gap width of 3 mm. This cooling loop was employed to cool the reaction mixture to an endpoint of 40° C. over a period of 1 hour.

The following ingredients were then added to the reactor:
Water—400 parts
Monomers (MMA/BA/BMA)—4900 parts
tert-Butyl Hydrogen Peroxide—1.5 parts
Sodium Formaldehyde Sulfoxylate—1.4 parts Following an induction period, the polymerization reaction occurred with no heating or cooling applied to the reactor. The temperature of the mixture reached 95° C. An additional 40 parts of Sulfonate surfactant and 40 parts of water were added to the reactor at this point. The polymer produced had a weight average molecular weight of 7,000,000, as determined by Gel Permeation Chromatography.

The reaction mixture was drained to a plate and frame heat exchanger and returned to the reactor using a Peristaltic type pump equipped with 1.27 cm (0.5 inch) diameter Tygon™ tubing. The plate and frame heat exchanger was equipped with 7.1 cm×18.8 cm (2.8 inch×7.4 inch) plates having a process side gap width of 3 mm.

Over a series of runs where flow rate and number of plates were varied, the following performance of the plate and frame heat exchanger was observed:

| Run# | Flow Channels | Exchange Rate/hr | Inlet Fouling | Plate Fouling | Loss of Flow |
|---|---|---|---|---|---|
| 1 | 3 | 0.6 | Yes | Yes | No |
| 2 | 1 | 1.2 | Yes | No | Yes |
| 3 | 1 | 1.2 | Yes | Yes | Yes |
| 4 | 1 | 1.2 | Yes | Yes | No |
| 5 | 1 | 1.2 | Yes | Yes | No |
| 6 | 3 | 3.6 | Yes | Yes | Yes |
| 7 | 1 | 1.2 | Yes | Yes | Yes |
| 8 | 1 | 1.2 | Yes | Yes | Yes |

The table above shows that at a range of flow conditions, blockage of a plate and frame heat exchange with a 3 mm gap width occurs, typically resulting in loss of flow through the recirculation loop.

Comparative Example B

The following ingredients were added to a 19 liter (5 gallon) reactor equipped with agitation and brought to a temperature of 48° C.
Water—5900 parts
Monomers (Styrene/BA/MMA)—5000 parts
Sodium Lauryl Sulfate Surfactant (28% solution)—250 parts
tert-Butyl Dodecylmercaptan—34 parts
tert-Butyl Hydrogen Peroxide—15 parts
Sodium Formaldehyde Sulfoxylate—15 parts Following an induction period, the polymerization reaction occurred. The temperature of the mixture reached 90° C.

The reaction mixture was drained to a plate and frame heat exchanger and returned to the reactor using a Peristaltic type pump equipped with 1.27 cm (0.5 inch) diameter Tygon™ tubing. The plate and frame heat exchanger was equipped with 7.1 cm×18.8 cm (2.8 inch×7.4 inch) plates having a process side gap width of 3 mm.

The duration of flow was less than ten minutes, using a flow rate of 2 reactor exchanges/hour, prior to a catastrophic blockage inside the pump tubing.

This example shows the shear sensitivity of this latex composition at the reaction temperature. The level of shear produced in the peristaltic pump was sufficient to coagulate the latex in the tubing at the pump head.

Example #1

The latex synthesis procedure described in Comparative Example A was followed.

A plate and frame heat exchanger using gap widths of 8 and 11 mm was used, replacing the heat exchanger that had a 3 mm gap width on the process fluid side. The following results were observed:

| Gap Width for Process Fluid | Inlet Fouling | Plate fouling | Loss of Flow |
|---|---|---|---|
| 8 mm | None | Slight | No |
| 11 mm | none | None | No |

The results show that the fouling problem of this latex composition is eliminated when a gap width larger than 3 mm is utilized.

Example #2

The latex synthesis procedure described in Comparative Example B was followed. A low shear pump was used together with a plate and frame heat exchanger having a gap width of 11 mm. The pump used was a Discflo pump manufactured by Discflo Corporation, 10850 Hartley Road, Santee, Calif. A custom model of this pump was produced by Discflo for use at laboratory scale (5 gallon reactor). A commercial-sized pump with model number 2015-8 (suction flange size 5 cm (2 inch), discharge flange size 3.8 cm (1.5 inch) was used for a 1,890 liter (500 gallon) reactor.

At two separate reactor scales (19 liter (5 gallon) and 1,890 liter (500 gallon)), the pump operated with no loss of flow over the temperature range of 90-56° C. and batch cooldown times of 20-50 minutes. The plate and frame heat exchanger used with the 19 liter reactor had 11 mm gap, and the plate and frame heat exchanger used with the 1,890 liter reactor had 12 mm gap. No blockages or fouling of the plate and frame heat exchanger occurred.

The results show that pump design having a low shear profile throughout the entirety of the pumping area, such as a Discflo pump, can pump a shear sensitive latex without forming coagulum.

Example #3

The latex synthesis procedure described in Comparative Example A was followed.

A plate and frame heat exchanger having a gap width of 12 mm was used. The Discflo pump described in Example #2 was used together with the heat exchanger at the 1,890 liter (500 gallon) scale. The pump was located on the outlet side of the heat exchanger. The cooldown rate obtained was a function of the flowrate through the recirculation loop as shown in the table below:

| Flowrate (to/from a 1,890 liter (500 gallon) reactor) | Average Batch Cooldown rate (in Deg C./min) | Average Outlet temperature of Heat Exchanger (deg C.) |
|---|---|---|
| 15 gal/min | 1 | 40 |
| 30 gal/min | 2 | 50 |
| 50 gal/min | 3 | 60 |

The results in the table above demonstrate the synergy between the Low Shear Pump and the Wide Gap Plate and Frame Heat Exchanger. The best possible heat removal rate in a plate and frame heat exchanger occurs at the highest temperature differential (average process side temperature vs. average coolant side temperature). In addition, the heat transfer coefficient improves with increases in flow turbulence caused by higher flow rates. The low pressure drop of a wide gap heat exchanger (6-18 mm) together with the low shear (=low coagulum) pump enables the use of high flow rates applied to sensitive emulsion polymers.

We claim:
1. A process of emulsion polymerization comprising
   (a) adding a reactive mixture to a reaction vessel, said reactive mixture comprising water, one or more emulsifier, one or more monomer, and one or more initiator,
   (b) providing conditions in which said reactive mixture undergoes emulsion polymerization, and
   (c) passing some of the contents of said reaction vessel through a recirculating loop comprising a low-shear pump and a plate and frame heat exchanger having gap width of 6 to 18 mm, wherein the amount of said contents of said reaction vessel that is passed through said recirculating loop is 0.5% to 100% by volume based on the sum of total volumes of the material in said reaction vessel and the material in said recirculating loop, wherein more than 50% of the heat produced by said emulsion polymerization is removed from the contents of said reaction vessel by said plate and frame heat exchanger.

2. The process of claim 1, wherein said monomer comprises one or more monomer selected from the group consisting of styrene, one or more substituted styrenes, vinyl acetate, acrylonitrile, (meth)acrylic acid, one or more substituted or unsubstituted (meth)acrylate, one or more substituted or unsubstituted (meth)acrylamide, and any mixture thereof.

3. The process of claim 1, wherein said monomer comprises one or more monomer selected from the group consisting of styrene, one or more unsubstituted alkyl acrylate ester, one or more unsubstituted alkyl methacrylate ester, and a mixture thereof.

4. The process of claim 1, wherein the polymer produced by said process has weight average molecular weight of 1,000,000 or higher.

5. The process of claim 1, wherein all of said monomer is added to said reaction vessel in the form of one or more shots, wherein each shot introduces at least 10% of the total monomer to the reaction vessel, by weight based on the total weight of all monomer used in said process.

6. The process of claim 1, wherein the amount of said contents of said reaction vessel that is passed through said recirculating loop is 0.5% to 40% by volume based on the sum of total volumes of the material in said reaction vessel and the material in said recirculating loop.

* * * * *